United States Patent [19]
Harrison

[11] Patent Number: 5,694,163
[45] Date of Patent: Dec. 2, 1997

[54] METHOD AND APPARATUS FOR VIEWING OF ON-LINE INFORMATION SERVICE CHAT DATA INCORPORATED IN A BROADCAST TELEVISION PROGRAM

[75] Inventor: Edward R. Harrison, Beaverton, Oreg.

[73] Assignee: Intel Corporation, Santa Clara, Calif.

[21] Appl. No.: 762,697

[22] Filed: Dec. 12, 1996

Related U.S. Application Data

[63] Continuation of Ser. No. 535,752, Sep. 28, 1995, abandoned.
[51] Int. Cl.$^6$ .................. H04N 7/14; H04N 7/00
[52] U.S. Cl. .................. 348/13; 348/468; 348/552; 379/90
[58] Field of Search .................. 348/468, 478, 348/465, 552, 12, 13, 6, 7, 3, 16, 17, 564; 379/90, 52; H04N 7/00, 7/08, 11/00, 7/087, 7/14

[56] References Cited

U.S. PATENT DOCUMENTS

| | | | |
|---|---|---|---|
| 3,743,767 | 7/1973 | Bitzer et al. | 178/5.6 |
| 4,486,779 | 12/1984 | Marti | 348/468 |
| 5,251,209 | 10/1993 | Jurkevich et al. | 370/82 |
| 5,283,639 | 2/1994 | Esch et al. | 455/53.1 |
| 5,347,304 | 9/1994 | Moura et al. | 348/12 |
| 5,347,315 | 9/1994 | Mary et al. | 348/473 |
| 5,359,367 | 10/1994 | Stockill | 348/552 |
| 5,375,160 | 12/1994 | Guidon et al. | 348/468 |
| 5,381,413 | 1/1995 | Tobagi et al. | 370/85.6 |
| 5,396,494 | 3/1995 | Roposh | 370/85.2 |
| 5,396,536 | 3/1995 | Yudkowsky | 379/52 |
| 5,442,389 | 8/1995 | Blahut et al. | 348/7 |
| 5,481,312 | 1/1996 | Cash et al. | 348/466 |
| 5,481,542 | 1/1996 | Logston et al. | 370/94.2 |
| 5,488,412 | 1/1996 | Majeti et al. | 348/10 |

*Primary Examiner*—Michael H. Lee
*Attorney, Agent, or Firm*—Blakely, Sokoloff, Taylor & Zafman

[57] ABSTRACT

A number of participants communicate via their personal computers over a telephone network with an on-line service that provides a chat capability. A server connects to the telephone network at the on-line service provider. A chat formatter at this server formats and transmits the chat over an associated data channel. This server accommodates both text and audio chat. A television program is combined with the associated data at a broadcast transmitter. The encoded television signal is broadcast over the airways by way of a broadcast tower, satellite or cable. A consumer receives the encoded television signal at a television antenna, satellite dish or cable connection. Software at the consumer's computer reads the broadcasted chat and formats it such that it appears on the computer screen as if the consumer were a participant in the chat. This software is tied to the broadcast of a particular television program. Seamless integration with a low-bandwidth data is back channel allows the consumer to view broadcast television program and chat, and participate in the chat by sending replies over the back channel.

14 Claims, 4 Drawing Sheets

METHOD AND APPARATUS FOR VIEWING OF ON-LINE INFORMATION SERVICE CHAT DATA INCORPORATED IN A BROADCAST TELEVISION PROGRAM

This is a continuation of application Ser. No. 08/535,752, filed Sep. 28, 1995, now abandoned.

BACKGROUND OF THE INVENTION

1. Field of the Invention

The present invention is related to computers and more specifically to a computer program for viewing of chat over associated data provided by way of on-line computer services in conjunction with a broadcast television program.

2. Prior Art

The Internet is a worldwide, on-line computer network of more than three million computers that connects governments, companies, universities, and other networks and users. The Internet began in 1984 with funding from the US government. Originally open only to government and university researchers, it is now open to anyone. The Internet and other on-line information services, such as COMPUSERVE, AMERICA ON LINE and PRODIGY, provide electronic mail, conferencing and chat services, and the ability to access remote computers for sending and retrieving files. The Internet and other on-line information services have been referred to metaphorically as an "information superhighway" by the news media.

One of the most popular features of the Internet and on-line services is on-line chat. Chat is informal communication among users of the Internet. The chat feature allows two or more people to converse by sending text messages back and forth through a chat room accessed via the on-line service. Only those connected to the on-line service, usually by a telephone modem, can participate in the chat, referred to as chat participants. Chat room "conversations" are displayed as text in a chat room window on a computer screen.

With the appearance of personal computer systems with the capability to reproduce audio as well as visual information, the technologies of television (TV) transmission and computer applications are merging. In television program transmission, it has become possible to transmit encoded data information in addition to the audio/video portion of the signal. Recent standards for television receivers include the requirement that all receivers provide the capability to display, in text, the audio portion of a transmitted TV program. For example, closed-captioned programming to serve the needs of the hearing-impaired. Closed-captioning uses the vertical blanking interval (VBI) for encoding text for the audio portion of the programming. Although closed-captioning does not interfere with the transmission of the video signal, it lacks the capability to be used in ways other than real-time display to the user. Furthermore, text processing operations commonly performed in personal computer word processing application programs are not accommodated.

In CNN at Work, a joint project of Intel Corporation and Cable Network News (CNN), consumers are provided with a sense that they are connected to the "information superhighway," without actually being connected to an Internet service provider. This done by sending data along with a standard television signal. This data is called "associated data". The data is called "associated" because the data is associated with a program being broadcast, for example digital "headlines" as associated with a news program being broadcast. A mechanism for accomplishing this is called video indexing protocol (VIP) and is disclosed in U.S. patent application Ser. No. 328,871 for "Video Indexing Protocol" of John David Miller filed Oct. 24, 1994. Described is a computer-implemented method and apparatus for transmitting information with a video signal. An application program creates a message to be transmitted to a receiver. The application transmits the message to a data encoder and the encoder receives the message and other messages from other applications. The encoder transforms the messages into packets and multiplexes them into a bitstream to be encoded with a video programming signal. The encoder transmits the bitstream to a video encoder that transmits the bitstream with the video programming signal. The encoded signal is received by a decoder. The decoder decodes the information from the video signal and transmits the information to a decoder application. For example the applications may create and transmit time references at regular intervals; program markers and/or program text, such as closed-captions and/or subtitles; and a non-program information. In this manner, useful, descriptive and other program or nonprogram-related information is transmitted along with a video signal and displayed and processed according to user requirements.

It has become desirable to provide a new service to subscribers to on-line information services, a service that enables a user to view a chat at a computer, without actually being an on-line participant in the chat. The chat being associated with a particular channel, such as the cable channel known as MTV (Music Television), but not necessarily a particular program being broadcast.

For example, suppose that several people are each watching, in a video window on their personal computer display screen, an episode of a television show that is currently being aired. If each person is connected via a modem over a telephone line to the internet, each can discuss the television program in a chat room displayed in a chat room graphical window on the same computer screen as the TV show is being displayed. It is desirable to allow viewers who do not desire to participate in the chat, or do not have the capability of participating in the chat, to view the conversations of the chat at the time of viewing the related television program. Currently MTV is broadcasting chat by scrolling the chat on a TV screen. However, it is desirable to provide a different service, the ability to view chat on a computer screen without being connected to an on-line service, but with sense that the viewer is connected to an on-line service. It is also necessary to provide this service while at the same time making the chat transparent to normal viewing of TV, such that the chat is not visible on the TV screen to non-subscribers to the service. Currently the MTV broadcast of chat does not have this capability.

SUMMARY OF THE INVENTION

Briefly, the invention is a computer software program in which a chat is formatted to provide a television compatible chat TV signal. The chat TV signal is inserted into a television program TV signal to provide an encoded TV signal. The encoded TV signal is broadcast over the airwaves on a television channel and received by a computer. At the computer the encoded TV signal is separated into an audio/visual portion and an encoded data portion. The television program is displayed in a first window, for example a video window, on the computer display screen. The chat encoded data is displayed in a second window, for example a chat room window, on the computer display screen using the same chat screen window as one would normally use if one were participating in the chat.

In accordance with an aspect of the invention, a telephone back channel is provided at a users computer that allows connection to an on-line service provider via the computers modem. If chat text is detected as being typed input at the computer's keyboard, a connected is made by dialing the on line service to initiate participation in the on going chat.

This invention encompasses a technology for "viewing" of chat over associated data. It also provides a wide-band down channel for chat to be integrated with a low bandwidth telephone back channel, if a back channel is available at the consumers computer site.

The present invention has the advantage that those viewers who do not desire to participate or do not have the capability of participating in a chat can view the contents of the chat by watching associated data transmitted with the television signal.

An advantage of this invention is that consumers do not have to be connected to the internet or on-line service in order to view a chat as observers who don't participate. This invention allows for view-only consumers, who view a chat that has been rebroadcast as associated data.

An advantage to the consumer is that there is no need to connect to a service provider to view a chat. Sponsors of a chat benefit because more people are involved in the chat, and may watch the television program associated with the chat.

Another advantage to the consumer is that a chat can be viewed without being connected to an on-line service, consequently avoiding telephone connect charges. The invention automatically makes a connection to the on-line service if the user chooses to participate at some point during the chat session by typing chat text at the computer keyboard.

The foregoing and other features and advantages of the invention will be apparent from the following more particular description of a preferred embodiment of the invention as illustrated in the accompanying drawings.

DESCRIPTION OF THE PREFERRED EMBODIMENT

Figure 1:
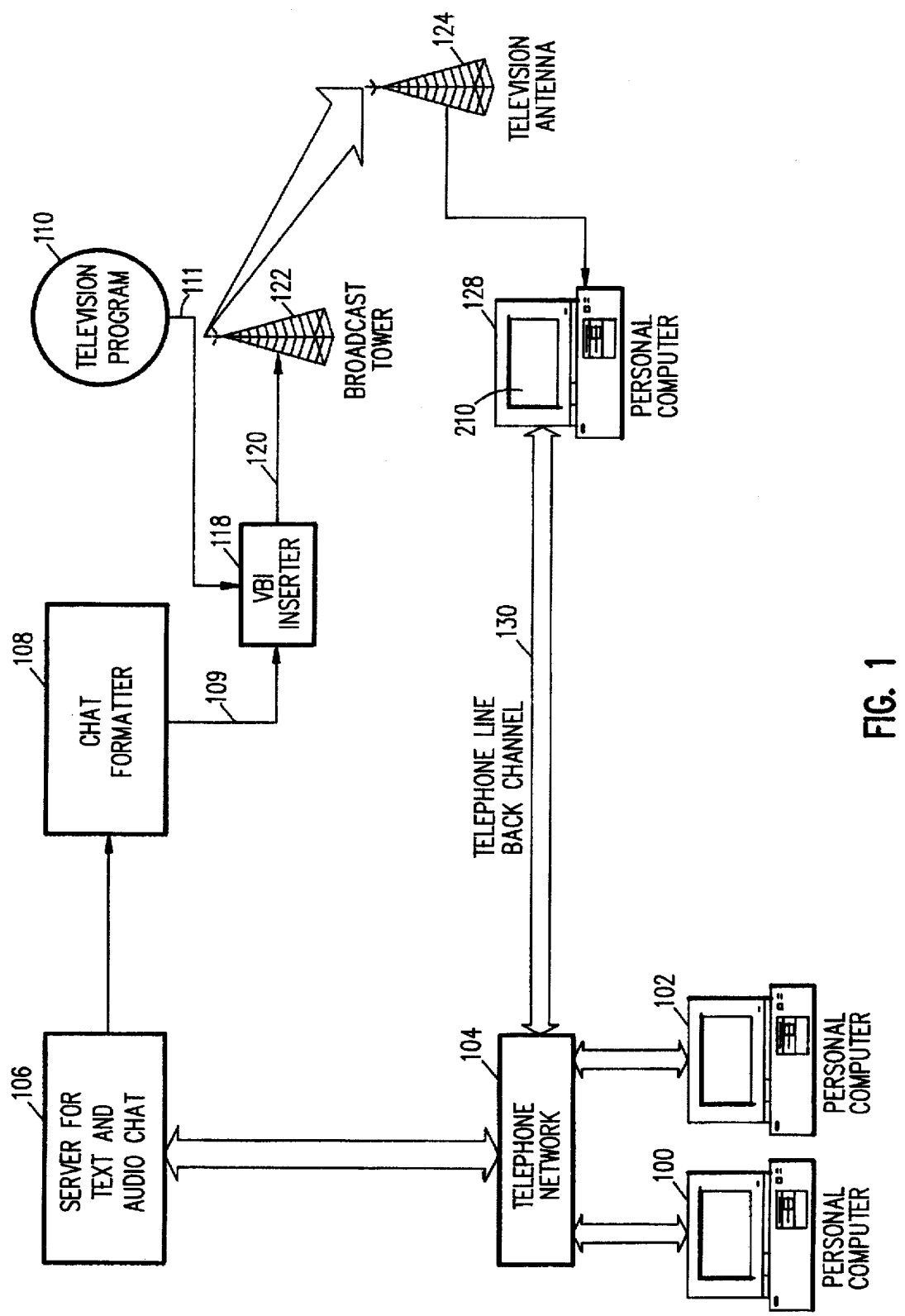
FIG. 1 is a diagram of a computer network and broadcast television method in accordance with the present invention.

Refer to FIG. 1 which is a diagram of a computer network and broadcast television method in accordance with the present invention. A number of participants communicate via their personal computers (100, 102) over a telephone network (104) with an on-line service that provides a chat capability. As used herein, the term "chat" is not limited to typed chat or text chat but includes audio chat and other representations of chat that allow informal communication among users of an on-line service. A server (106) connects to the telephone network (104) at the on-line service provider. A chat formatter (108) at this server formats and transmits the chat as associated data over a chat data channel (109). This server (106) accommodates both text and audio chat. This chat server in the same server that currently is used at an on-line service.

The chat data is inserted into a television program signal (110) at a vertical blanking interval (VBI) inserter (118) resulting in an encoded television signal (120). The encoded television signal (120) is broadcast over the airwaves on an assigned television channel by way of a broadcast tower, cable or satellite (122). A consumer receives the encoded television signal at a television antenna, cable or satellite dish (124). It will be understood by those skilled in the art that the encoded television signal (120) may broadcast over a cable TV network.

Software at the consumer's computer (128) reads the rebroadcast chat and formats it such that it appears on the computer screen (210) as if the consumer were a participant in the chat. This software is tied to the broadcast of a particular television program.

The invention also provides seamless integration with a low-bandwidth data back channel (130), where available. This telephone back channel allows the consumer to view broadcast chat, and participate in the chat by sending replies over the back channel (130).

Receiver Logic

Figure 2:
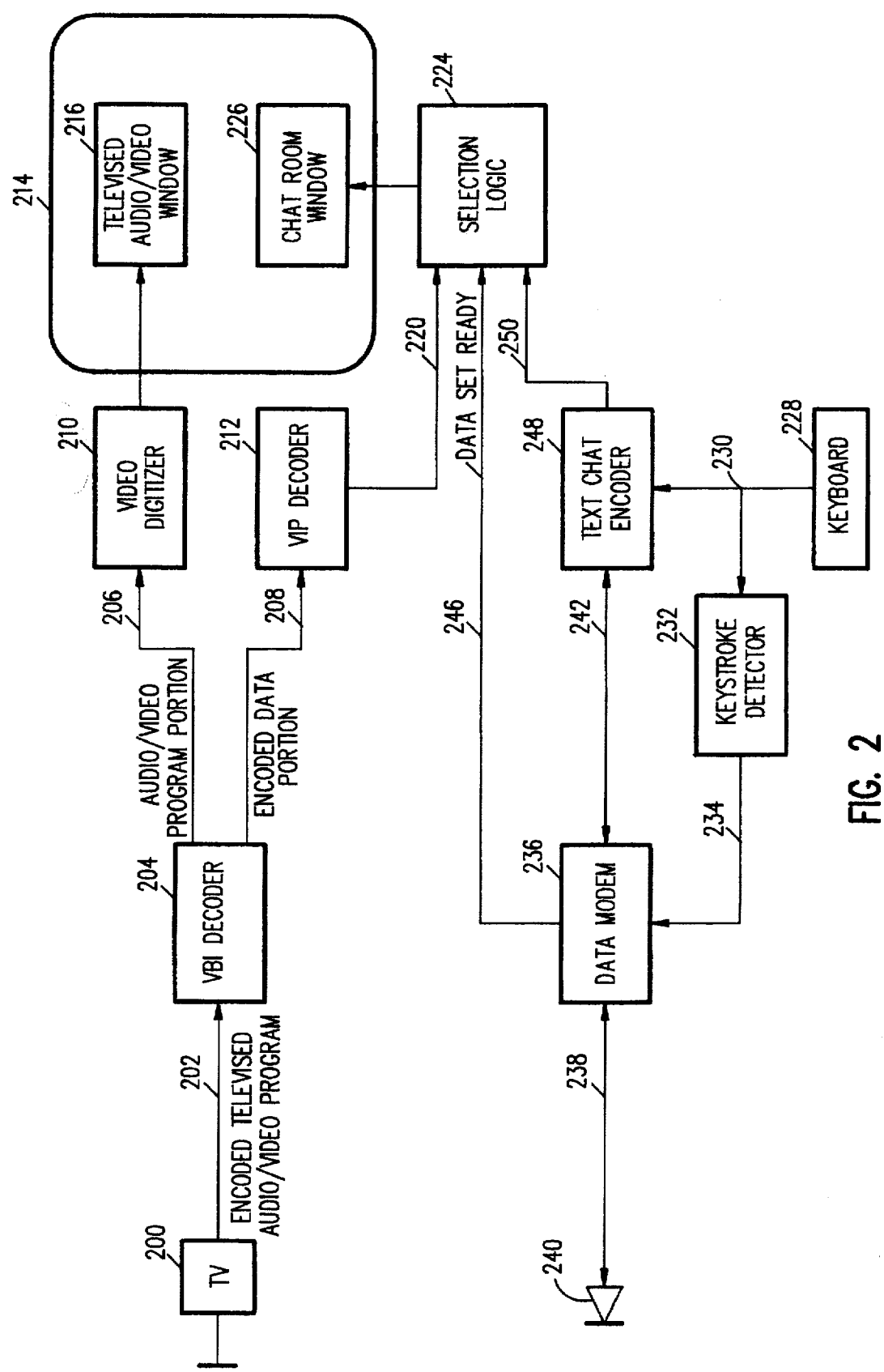
FIG. 2 is a block diagram of a receiver logic at consumer's computer of FIG. 1.

Refer to FIG. 2 which is a block diagram of a receiver logic at a consumer's computer (128) of FIG. 1. The encoded televised audio/visual program is received at a television (TV) input terminal (200) at a consumer's computer and is input to a vertical blanking interval (VBI) decoder (204). The VBI decoder separates the encoded televised audio/visual program into its component parts, an audio/visual program portion (206) and an encoded data portion (208). The audio/visual portion is directed to a video digitzer (210) and the encoded data portion is directed to a VIP decoder (212). The video digitzer (210) prepares the audio/visual program for display in a televised audio/visual video window (216) on computer display screen (214). The VIP decoder (212) prepares the encoded data portion for display in a chat room window (226) on computer display screen (214).

The entire chat session is displayed for viewing on the computer screen without the need for a telephone connection to an on-line service, and the resulting telephone charges. A telephone back channel (130) is provided at users computer (128) that allows connection to an on-line service provider via the computers data modem (216).

A text chat encoder (248) receives typed text from a keyboard (228) at consumer's computer (128). The text chat encoder (248) is connected to a data modem (236) that provides a connection to telephone network (104) of FIG. 1 by means of a data outlet (240) that provides access to the telephone back channel (130).

A keystroke detector (232) connected to the output (230) of the keyboard (228) detects chat text being input at the keyboard. If outgoing chat text is detected as typed input at the computer's keyboard (228), a connection is by dialing up the on line service to initiate participation in the on-going chat. The typed chat is then transmitted over the back channel telephone connection (130) to the on-line service hosting the chat. From this point on the chat session, including the user's now participation, is continued by being displayed for viewing on the computer screen over the television channel, with the telephone back channel connection (130) to the on-line service supporting the user's participation. The displayed chat (226) now includes the typed chat that is transmitted over the back channel. It will be understood by those skilled in the art that the connection to the on-line service can be effected by software protocols or hardware, or a combination of harware and software. For example, the output (234) of the keystroke detector (232)

signals the data modem (236) to dial up the on-line service and make a connection. Once a connection is made, the data modem asserts the data set ready line (246). The data set ready (DSR) signal (246) from the data modem (236) indicates whether the modem is ready to send and receive information with a remote modem at the on-line service communication system.

A selection logic (224) is connected to the VIP decoder (212), the text chat encoder (248) and the data set ready signal (217) from data modem (216). The selection logic selects the chat for display from the chat encoder (248) whenever the data set ready signal (246) is asserted, so that the chat that is displayed is from the on-line service, rather than the output (220) from the VIP decoder (212).

Broadcast Process

Figure 3:
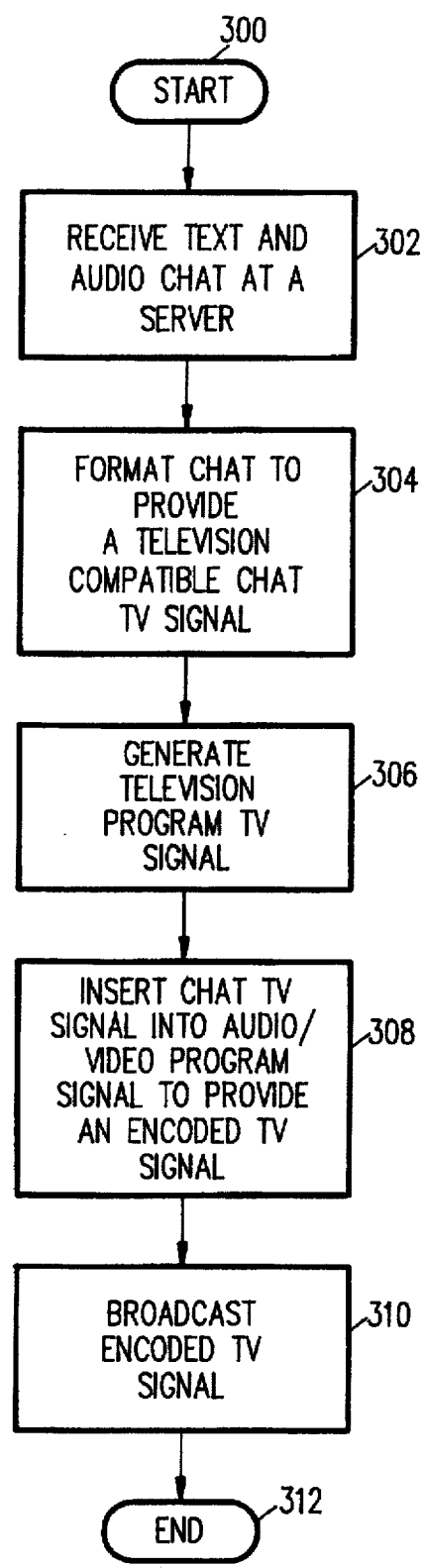
FIG. 3 is a flow chart of the operation of a broadcast of chat encoded with a TV program; and, FIG. 4 is a flow chart of the operation of a receiver of the broadcast of FIG. 2.

Refer to FIG. 3 which is a flow chart of the operation of a broadcast of chat and a TV program. The process starts (300) and text and audio chat is received at a server (302). The chat is formatted to provide a television compatible chat TV signal (304). An audio/visual television program is generated (306). The chat TV signal is inserted into the audio/visual television program TV signal to provide an encoded TV signal (308). A mechanism for accomplishing this is disclosed in the above referenced U.S. patent application Ser. No. 328,871. The encoded TV signal is broadcast (310) over the air waves and the broadcast process ends (312).

Video Indexing Protocol

The above referenced U.S. patent application Ser. No. 328,871 describes a method and apparatus for transmitting information in conjunction with a video signal, called the Video Indexing Protocol (VIP). The system includes a master encoder which receives encoded messages from a plurality of computer systems which communicate with the encoder via a networking medium such as a local area network (LAN). The encoders convert their respective information into messages to be processed by the encoder, and software within the encoder packetizes and prioritizes these messages as packets which are then transmitted to a vertical blanking interval (VBI) inserter.

The VBI inserter may be any number of VBI inserters as are commercially available, such as the model number TDS-3 brand VBI inserter available from Norpak Corporation of Ottawa, Ontario, Canada. This information is transmitted along with the audio/video program content.

Receiver Process

Figure 4:
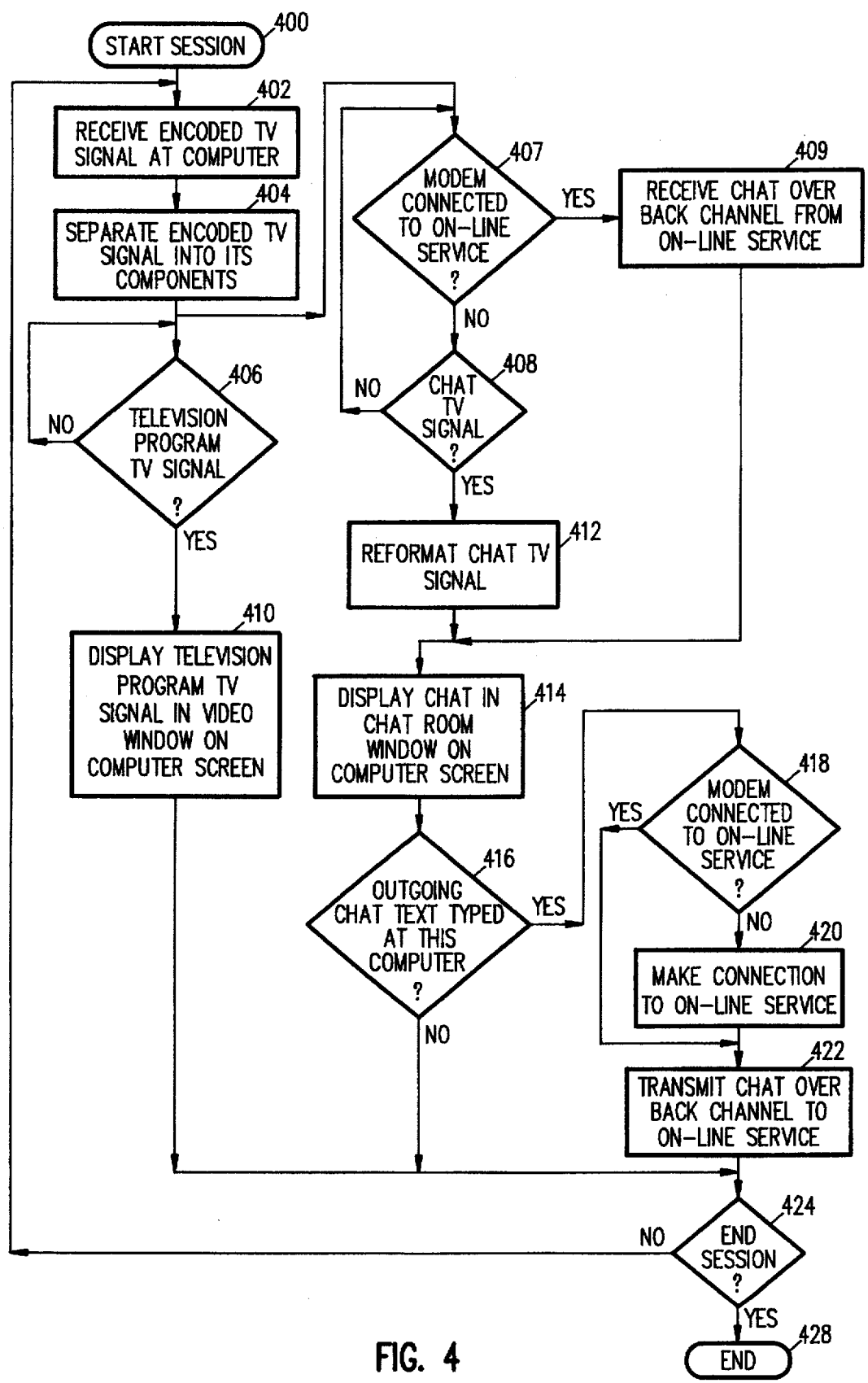

Refer to FIG. 4 which is a flow chart of the operation of a receiver of the broadcast of FIG. 3. The chat session starts (400) and an encoded TV signal is received at a computer (402). The encoded TV signal is separated into its component parts (404), which are a television program TV signal and a chat TV signal. The television program TV signal is recognized (406) and is displayed (410) in a first window, which may be a video window, on the computer screen. The chat TV signal is also recognized (408), reformatted to be compatible with computer technology (412) and displayed (410) in a second window, which may be a chat room window, on the computer screen.

Up to this point, the entire chat session is displayed for viewing on the computer screen without the need for a telephone connection to an on-line service, and the resulting telephone charges. A telephone back channel is provided at users computer (128) that allows connection to an on-line service provider via the computers data modem (216). If outgoing chat text is detected as typed input at the computer's keyboard (416), a connection is made by dialing up the on line service (420) to initiate participation in the on-going chat. The typed chat is then transmitted (422) over the back channel telephone connection (130) to the on-line service hosting the chat. From this point on the chat session, including the user's now participation, is continued by being displayed for viewing on the computer screen over the television channel, with the telephone back channel connection (130) to the on-line service supporting the user's participation. The displayed chat now includes the typed chat that is transmitted over the back channel.

The chat session continues until the user ends the session (424), at which time the process ends (428).

SUMMARY OF PREFERRED EMBODIMENT

An apparatus is provided for use with a communication system in which a chat TV signal (109) is inserted into a television program TV signal (111) to provide an encoded TV signal (120) that is broadcast. A personal computer has a computer display (214). A VBI decoder (204) separates the encoded TV signal into an audio/video portion (206) and an encoded data portion (208). A video digitizer (210) connected to the decoder formats the television program TV signal for display in a first window (216), which may be a video window, on the computer display. A VIP decoder (212) connected to the VBI decoder formats the reformatted chat TV signal for display in a second window (226), which may be a chat room window, on the computer display. An input keyboard (228) at the computer is used for inputting chat. A data modem (236) is provided for making a connection with the communication system. A keystroke detector (232), connected to the input keyboard (228) and to the data modem (236), detects input chat and signals the data modem (236) to make a connection with the communication system upon a condition that input chat is detected.

A text chat encoder (248) is connected to the keyboard (228) and to the data modem (236). A selection logic (224) connected to the data modem (236) and to the VIP decoder (212) selects for display as between the reformatted chat TV signal (220) and chat (250) received over the data modem.

A method is disclosed for receiving a TV program encoded with chat, for making the information useable at a personal computer. A chat is received (302). The chat is formatted to provide a television compatible chat TV signal (304). The chat TV signal is inserted into the television program TV signal (306) to provide an encoded TV signal (308). The encoded TV signal (310) is broadcast and received at a computer (302). The encoded TV signal includes both a television compatible chat TV signal and a television program TV signal.

The encoded TV signal is separated to provide the television compatible chat TV signal and the television program TV signal (304). The chat TV signal is reformatted to provide a reformatted chat TV signal (312). The television program TV signal is displayed in a first window on the computer display screen (310). The reformatted chat TV signal is displayed in a second window on the computer display screen (310). The first window may be a video window and the second window may be a chat room window.

Outgoing chat text typed at the computer is detected. A connection to an on-line service is made upon a condition that outgoing chat text typed at the computer is detected. The chat text typed at the computer is transmitted to the on line service over the connection. Chat data is received over the connection. A selection is made for display as between the reformatted chat TV signal and chat data received over the connection.

While the invention has been particularly shown and described with reference to preferred embodiments thereof, it will be understood by those skilled in the art that the foregoing and other changes in form and detail may be made therein without departing from the scope of the invention.

What is claimed is:

1. An apparatus for retrieving chat data encoded in an encoded television signal and for detecting user-input chat data, said apparatus comprising:

a receiver for receiving said encoded television signal;

a Vertical Blanking Interval (VBI) decoder coupled to said receiver, said VBI decoder for separating said encoded television signal into an audio/video portion and an encoded data portion;

a digitizer for digitizing said audio/visual portion, said digitized audio/video portion being displayed in a first window;

a Video Indexing Protocol (VIP) decoder for decoding said encoded data portion into said chat data, said chat data being displayed in a second window;

a detector for detecting said user-input chat data, said detector generating a signal when said user-input chat data is detected; and a modem coupled to said detector, said modem receiving said signal from said detector and automatically establishing a connection to a communications system in response to said signal.

2. The apparatus according to claim 1, wherein said second window is a chat room window.

3. The apparatus according to claim 2 wherein said chat room window contains chat data from an on-line chat group.

4. The apparatus according to claim 1 wherein said chat data being displayed in said second window is associated with said audio/video portion displayed in said first window.

5. The apparatus according to claim 1 further comprising a keyboard for inputting said user-input chat data.

6. The apparatus according to claim 1 further comprising a telephone back channel for connecting said apparatus to said communications system.

7. The apparatus according to claim 1 wherein said receiver for receiving said encoded television signal is one of a television antenna, a cable and a satellite dish.

8. A method for retrieving chat data encoded in an encoded television signal and for detecting user-input chat data, said method comprising the steps of:

receiving said encoded television signal;

separating said encoded television signal into an audio/video portion and an encoded data portion;

digitizing said audio/visual portion, said digitized audio/video portion being displayed in a first window;

decoding said encoded data portion into said chat data, said chat data being displayed in a second window;

detecting said user-input chat data;

generating a signal when said user-input chat data is detected; and automatically establishing a connection to a communications system in response to said signal.

9. The method according to claim 8, wherein said second window is a chat room window.

10. The method according to claim 9, wherein said chat room window contains chat data from an on-line chat group.

11. The method according to claim 8 wherein said chat data being displayed in said second window is associated with said audio/video portion displayed in said first window.

12. The method according to claim 8 wherein user-input chat data is input via a keyboard.

13. The method according to claim 8 wherein said communications system is connected via a telephone back channel.

14. The method according to claim 8 wherein step of receiving said encoded television signal includes the step of receiving said encoded television signal on one of a television antenna, a cable and a satellite dish.

* * * * *